United States Patent
Gassert et al.

(10) Patent No.: US 9,122,508 B2
(45) Date of Patent: Sep. 1, 2015

(54) REAL TIME MEASUREMENT OF I/O INTERRUPT DELAY TIMES BY HYPERVISOR BY SELECTIVELY STARTING AND/OR STOPPING CORRESPONDING LPARS

(75) Inventors: Francis Gassert, Monroe, NY (US); Kenneth J. Oakes, Wappingers Falls, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 13/524,315

(22) Filed: Jun. 15, 2012

(65) Prior Publication Data

US 2013/0339948 A1 Dec. 19, 2013

(51) Int. Cl.
G06F 9/455 (2006.01)
G06F 9/46 (2006.01)
G06F 3/00 (2006.01)
G06F 13/24 (2006.01)
G06F 13/26 (2006.01)
G06F 11/34 (2006.01)

(52) U.S. Cl.
CPC ........ G06F 9/45558 (2013.01); G06F 11/3419 (2013.01); G06F 11/3485 (2013.01); G06F 2009/45579 (2013.01); G06F 2201/815 (2013.01)

(58) Field of Classification Search
CPC .............. G06F 9/45533; G06F 9/5077; G06F 9/45558; G06F 11/0712; G06F 11/0724; G06F 9/45545
See application file for complete search history.

(56) References Cited

U.S. PATENT DOCUMENTS

| | | | |
|---|---|---|---|
| 5,615,343 A | 3/1997 | Sarangdhar et al. | |
| 7,000,036 B2 * | 2/2006 | Carlson et al. | 710/18 |
| 7,185,168 B2 * | 2/2007 | Rudeseal et al. | 711/173 |
| 2009/0055834 A1 | 2/2009 | Ding et al. | |
| 2009/0172225 A1 | 7/2009 | Wiedenman et al. | |
| 2010/0325268 A1 | 12/2010 | Muthiah et al. | |

(Continued)

FOREIGN PATENT DOCUMENTS

| | | |
|---|---|---|
| CN | 102222034 A | 10/2011 |
| CN | 102314377 A | 1/2012 |

OTHER PUBLICATIONS

C. Bezerra, et al., "A Short Study of the Addition of an L4 Cache Memory with Interleaved Cache Hierarchy to Multicore Architectures," Aug. 2009, VII Workshop de Processamento Paralelo e Distribuido, Porto Algre, RS, Brazil; Retrieved on Jun. 13, 2014; 4 pages.

(Continued)

*Primary Examiner* — Abdullah Al Kawsar
*Assistant Examiner* — Bing Zhao
(74) *Attorney, Agent, or Firm* — Cantor Colburn LLP; Steven Chiu (57) ABSTRACT

A computer system includes memory divided into a plurality of logical partitions (LPARs), each LPAR running one of a plurality of instances of an operating system (O/S). The system also includes a processor configured to run a hypervisor program to manage operation of the plurality of LPARs. The processor determines a reference I/O service time of an I/O operation on a server, measures an actual I/O service time of the operation, and determines a delay time of virtualization on the server based on the reference I/O service time and the actual I/O service time.

18 Claims, 5 Drawing Sheets

(56) References Cited

U.S. PATENT DOCUMENTS

2011/0252202 A1 10/2011 Heine et al.
2012/0096205 A1 4/2012 Velayudhan et al.

OTHER PUBLICATIONS

International Search Report and Written Opinion for International Application No. PCT/IB2013/054161, Filing Date: May 21, 2013; Date of Mailing: Oct. 3, 2013; pp. 1-9.

* cited by examiner

REAL TIME MEASUREMENT OF I/O INTERRUPT DELAY TIMES BY HYPERVISOR BY SELECTIVELY STARTING AND/OR STOPPING CORRESPONDING LPARS

BACKGROUND

The present invention relates to measuring the delay to the processing of I/O operations caused by server virtualization, and in particular to measuring a time taken by a hypervisor to manage multiple instances of an operating system.

In computers operating with virtual machines, a hypervisor program divides physical resources, including a central processing unit (CPU), memory, storage, and I/O devices, of a real computer into separate virtual machines. For example, the hypervisor may allocate a predetermined time frame in which each virtual machine may access the CPU, and predetermined portions of memory or storage accessible by the respective virtual machines.

When an interrupt occurs targeting a particular virtual machine, the hypervisor receives the interrupt and determines to which virtual machine the interrupt is directed. If another virtual machine is utilizing system resources, such as the CPU, a delay is caused in processing the interrupt by the target virtual machine until the hypervisor controls the CPU to begin running the target virtual machine. The target virtual machine may then perform one or more functions based on receiving the interrupt.

Other delays resulting from hypervisor managing of multiple virtual machines include emulation overhead in which instructions and operations to access I/O devices are intercepted by the hypervisor and scheduling delays due to packet transmission and reception involving multiple hypervisor threads and virtual machines.

SUMMARY

Exemplary embodiments include a method of determining a reference I/O service time of an I/O operation on a server. The server may include a processor running a hypervisor configured to manage a plurality of logical partitions (LPARs), and each LPAR may be running one of a plurality of instances of an operating system (O/S). The method may further include measuring, by the processor, an actual I/O service time of the I/O operation and determining, by the processor, a delay time of virtualization on the server based on the reference I/O service time and the actual I/O service time.

Additional exemplary embodiments include a computer program product including a non-transitory storage medium readable by a processing circuit of a computer and storing instructions for execution by the processing circuit for performing a method. The method may include determining a reference I/O service time of an I/O operation on a server. The server may include a processor running a hypervisor configured to manage a plurality of logical partitions (LPARs), and each LPAR may be running one of a plurality of instances of an operating system (O/S). The method may further include measuring, by the processor, an actual I/O service time of the I/O operation and determining, by the processor, a delay time of virtualization on the server based on the reference I/O service time and the actual I/O service time.

Further exemplary embodiments include a computer system including memory divided into a plurality of logical partitions (LPARs), each LPAR running one of a plurality of instances of an operating system (O/S) and a processor. The processor is configured to run a hypervisor program to manage operation of the plurality of LPARs. The processor may determine a reference I/O service time of an I/O operation on a server and measure an actual I/O service time of the I/O operation. The processor may further determine a delay time of virtualization on the server based on the reference I/O service time and the actual I/O service time.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, a delay caused by a hypervisor managing multiple virtual machines or logical partitions (LPARs) is calculated in real-time by calculating an elapsed time between when a sub-channel generates an I/O interrupt and a time when the target operating system (O/S) is dispatched by the hypervisor and generates a signal that the I/O interrupt has been received and processed.

Figure 1:
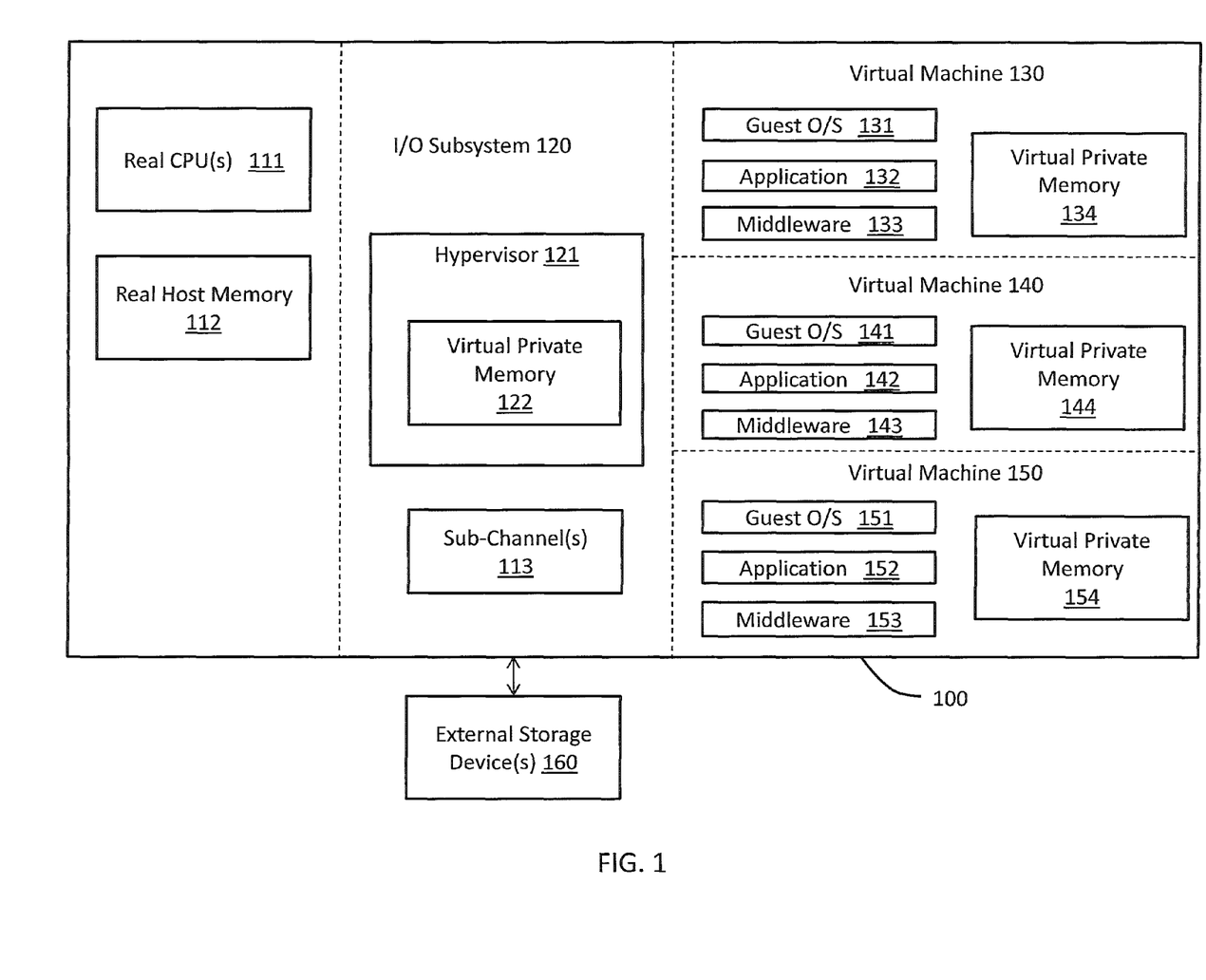
FIG. 1 illustrates a virtual machine system according to one embodiment of the present disclosure.

FIG. 1 illustrates a block diagram of a virtual machine system 100 according to an embodiment of the present disclosure. The system 100 includes one or more real CPUs 111 and real host memory 112. The one or more real CPUs 111 may each correspond to a separate processor, or each CPU 111 may correspond to a plurality of processors, processing units, or processing cores, depending upon the design requirements of the system 100. The system 100 further includes an I/O subsystem 120 and one or more virtual machines 130, 140, and 150. The virtual machines 130, 140, and 150 may also be referred to as logical partitions (LPARs) 130, 140, and 150. The system 100 is connected to one or more external storage devices 160.

Each virtual machine 130 may include an instance or image of an operating system (O/S) 131, 141, and 151 (also referred to as a guest O/S 131, 141, and 151). Each virtual machine may further include one or more applications 132, 142, 152, middleware 133, 143, 153, and virtual private memory 134, 144, and 154. For purposes of description, the virtual machine 130 will be described by way of example, although it is understood that the description of virtual machine 130 applies to each of the virtual machines 130, 140, and 150.

The guest O/S 131 may be an instance or an image of an O/S stored in the real host memory 112. Similarly, the application 132 and middleware 133 may be instances or images of applications and middleware stored in the real host memory 112. The virtual private memory 134 may be memory addresses within the real host memory 112 designated as corresponding to the virtual machine 130. In operation, each virtual machine 130, 140, and 150 operates separately from each other virtual machine 130, 140, and 150, running separate instances of operating systems, applications, and middleware, and storing data in separate memory, or portions of the real host memory 112 designated as corresponding to the respective virtual machines 130, 140, and 150.

The I/O subsystem 120 includes a hypervisor 121, or an LPAR dispatcher 121, to control operation of the virtual machines 130, 140, and 150. The hypervisor 121 may have virtual private memory 122 dedicated to the hypervisor 121. The hypervisor 121 may be a program stored in the real host memory 112 and executed by the one or more real CPUs 111, and the virtual private memory 122 may be a segment of the real host memory 112 dedicated to the hypervisor 121.

The hypervisor 121 manages the virtual machines 130, 140, and 150 by controlling which virtual machine 130, 140, and 150 may access the one or more real CPUs 111 at any given time, and by determining which transmitted and received signals, instructions, or other data corresponds to which virtual machine 130, 140, and 150. For example, if a signal is received from a sub-channel 113 for the virtual machine 130 while the virtual machine 150 is utilizing the one or more CPUs 111, the hypervisor 121 stores the signal until the virtual machine 130 is running and provides the signal to the virtual machine 130.

The I/O subsystem 120 further includes one or more sub-channels 113. The sub-channels 113 may correspond to data communication ports, supporting circuitry, and memory to communicate between the system 100 and external devices, such as the external storage device 160. Although one sub-channel 113 and one external storage device 160 is illustrated in FIG. 1, it is understood that embodiments of the present disclosure encompass any number of sub-channels 113 connected to any number of external storage devices 160. In particular, specific sub-channels 113 may correspond to specific external storage devices 160, such that an operating system must access particular sub-channels 113 to access corresponding external storage devices 160.

In embodiments of the present disclosure, the hypervisor 121 tracks, in real-time, a time that it takes to manage the virtual machines 130, 140, and 150. Managing the virtual machines 130, 140, and 150 may include storing signals, commands, interrupts, or other data intended for a particular virtual machine until that particular virtual machine is running. Managing the virtual machines may also include determining whether to stop operation of a virtual machine to provide access to another virtual machine. For example, when the three virtual machines 130, 140, and 150 all utilize the CPUs 111, the hypervisor 121 may control the virtual machines 130, 140, and 150 such that each virtual machine 130, 140, and 150 accesses the CPUs one third of the time. However, the hypervisor 121 may determine whether to make an exception to the division of time among the virtual machines 130, 140, and 150 to allow one virtual machine to cut into the time of another, based on a type of command, signal, or data received or processed, a type of operation being run by a virtual machine, or any other consideration.

In operation, an application 132 or middleware 133 operating on the one or more real CPUs 111 may request access to a device, such as the external storage device 160. The access may include retrieving data in a load operation or sending data in a store operation. Although the external storage device 160 is provided as an example of a device that may be accessed by the system 100, it is understood that any device, such as a media device, display device, storage device, network device, or any other device, may be accessed by the system 100. The guest O/S 131 generates an access request signal based on the request from the application 132 or middleware 133. In one embodiment, the access request signal is a Start SubChannel (SSCH) signal.

The guest O/S 131 transmits the SSCH signal to the I/O subsystem 120. The I/O subsystem 120 may determine which sub-channel among a plurality of sub-channels corresponds to the device 160 that is the desired destination of the SSCH request. The I/O sub-system 120 transmits the SSCH with the address of the desired device 160 to the sub-channel 113, which controls one or more switches or other devices to allow communication between the sub-channel 113 and the external storage device 160. In a load operation, data may be provided from a specified address of the external storage device 160 to the sub-channel 113. In a store operation, data may be provided from the sub-channel 113 to the external storage device 160.

Once the external storage device 160 is accessed, and data, if any, is stored in the real host memory 112, the sub-channel 113 generates an I/O interrupt and provides the I/O interrupt to the hypervisor 121 indicating that an operation has been completed. The hypervisor 121 may determine a guest O/S, or instance, among the virtual machines 130, 140, and 150 to which the I/O interrupt is intended. For example, the hypervisor 121 may determine that the I/O interrupt is to be provided to the guest O/S 131.

The hypervisor 121 may store the I/O interrupt in a cache or buffer. The cache or buffer may include a plurality of I/O interrupts corresponding to different guest operating systems 131, 141 and 151, and the hypervisor 121 may dispatch the I/O interrupts asynchronously and out of order. The hypervisor 121 may determine whether to halt operation of a presently-running guest O/S to provide an I/O interrupt to another guest O/S, or to permit the presently-running guest O/S to complete running.

When the target guest O/S is running, or the guest O/S 131 in the present example, the hypervisor 121 may provide the I/O interrupt to the guest O/S 131. The guest O/S 131 may then perform an operation completion routine to determine the state of the sub-channel 113 and whether the device has been accessed. In embodiments of the present disclosure, the operation completion routine may be a test sub-channel (TSCH) command. Upon determining that the device 160 has been successfully accessed, such as by a load or store operation, the guest O/S 131 may inform the application 132 or middleware 133 that data is available or has been stored.

In embodiments of the present disclosure, the hypervisor 121 tracks a time between receipt of the I/O interrupt from the sub-channel 113 and a time that the guest O/S 131 generates the TSCH signal to retrieve the status of the sub-channel 113. Accordingly, I/O subsystem 120 is able to track a delay in executing instructions from the virtual machines 130, 140, and 150 due to running the hypervisor 121 and running the multiple virtual machines 130, 140, and 150 instead of only one operating system. The tracked delay corresponds to the time required for the hypervisor 121 to manage an I/O interrupt directed to one of the guest operating systems 131, 141, or 151.

In some embodiments, once a delay due to virtualization has been calculated, the real CPUs 111 or I/O subsystem 120 may perform capacity planning to manage operations of the hypervisor 121, guest operating systems 131, 141, and 151, or the external storage devices 160. In addition, the real CPUs or I/O subsystem 120 may provide hot spot analysis by identifying operations, operating systems 131, 141, or 151, applications 132, 142, or 152, or middleware 133, 143, or 153 that contributes most to a detected delay.

Figure 2:
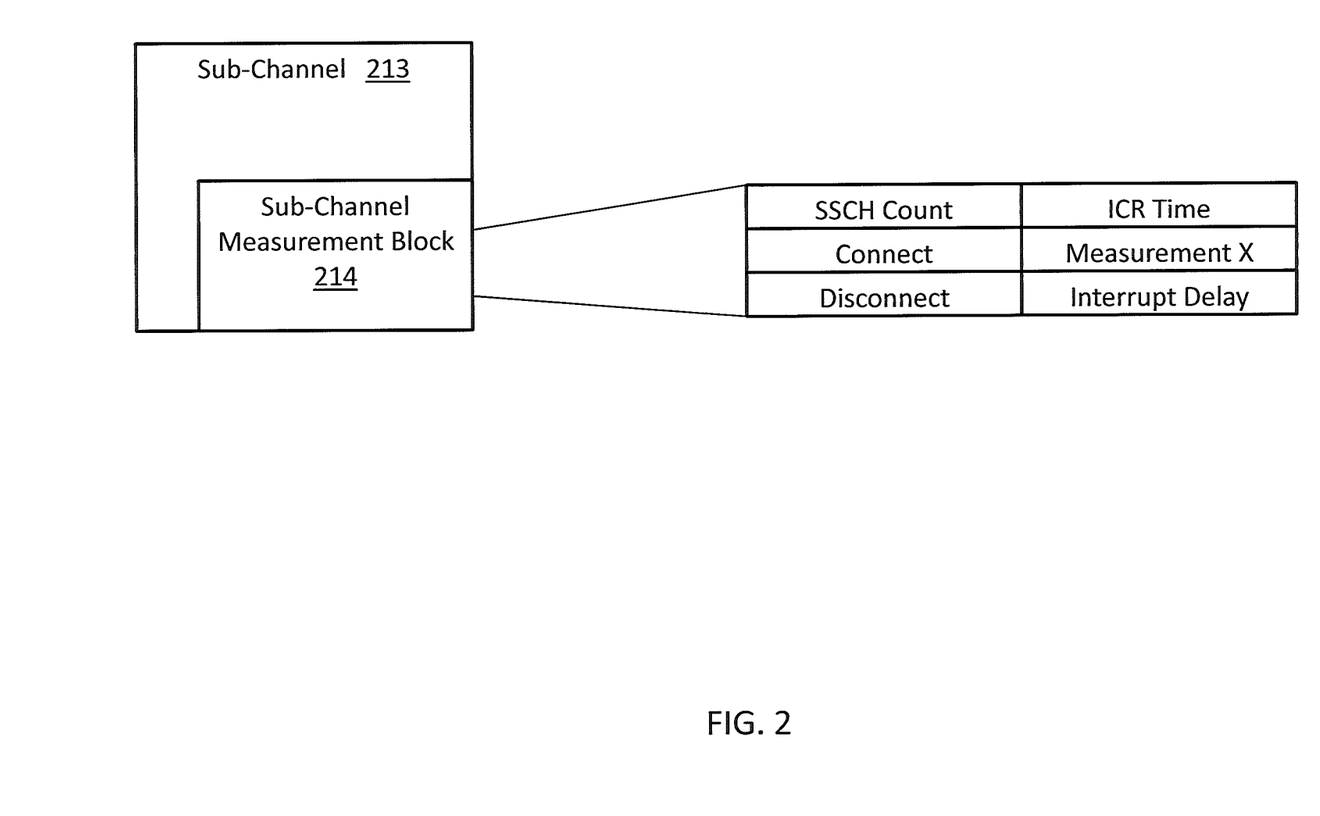
FIG. 2 illustrates a sub-channel measurement block according to one embodiment.

FIG. 2 illustrates the storage of a measured elapsed time according to an embodiment of the disclosure. The sub-channel 213 may correspond to the sub-channel 113 of FIG. 1, and may be one of a plurality of sub-channels, each connected to one or more external devices to provide communication between the system 100 and the external devices. The sub-channel 213 may include a measurement block 214 that includes fields for storing operation information of the sub-channel 213. Example measurements may include a Start Sub-Channel count, connect and disconnect times, an Initial Command Response (ICR) time, any other desired measurement (depicted as "measurement X"), and an interrupt delay time. In embodiments of the present disclosure, the interrupt delay time corresponds to a time from which an I/O interrupt is generated by the sub-channel 213 to indicate that an external device has been accessed, and a time that a signal, such as a Test Sub-Channel (TSCH) signal is received from an O/S in response to the I/O interrupt. The Interrupt Delay time may thus provide a measurement of a time delay generated by the hypervisor 121 running a plurality of instances of an O/S 131, 141, and 151.

Figure 3:
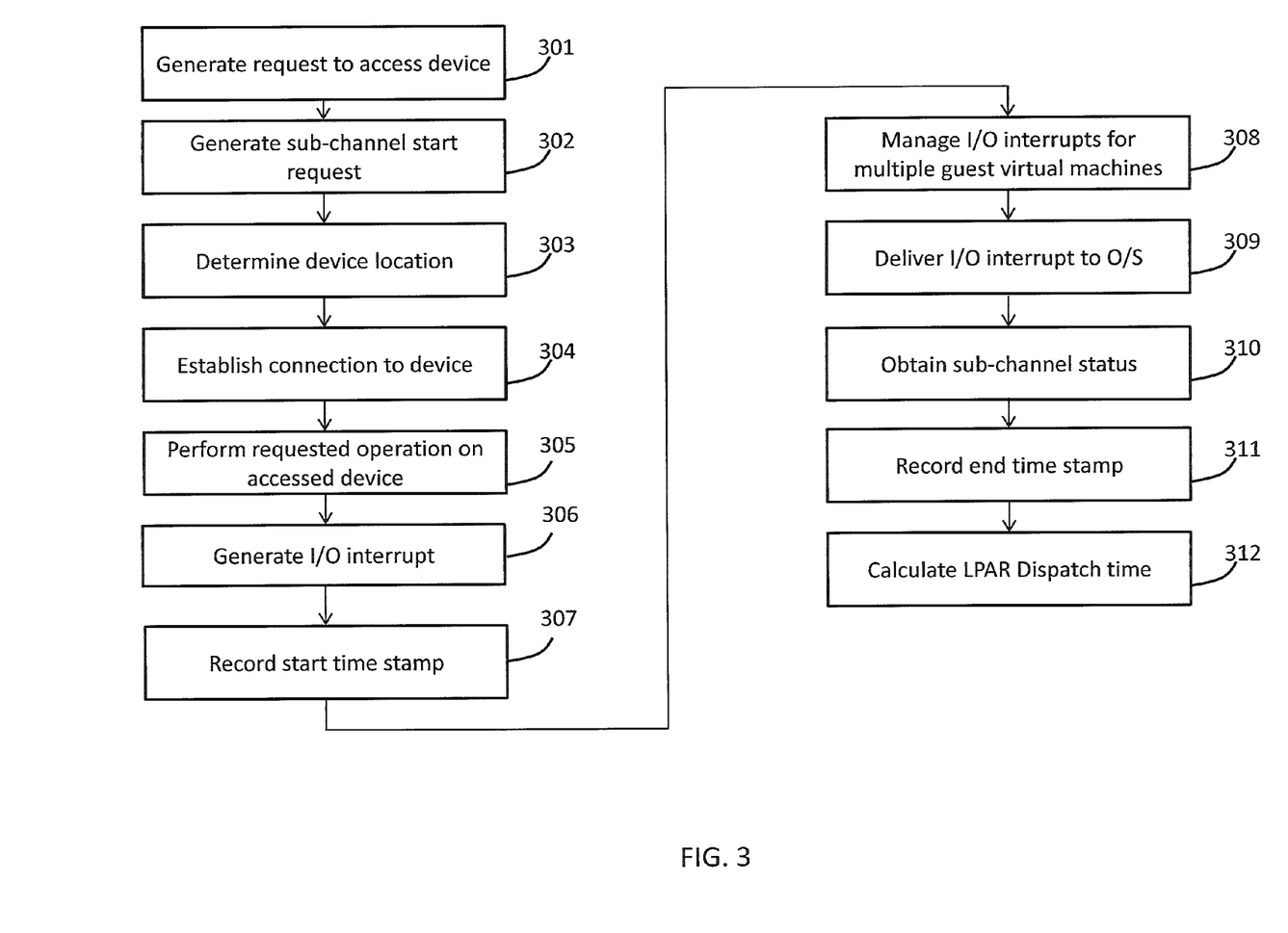
FIG. 3 illustrates a block diagram of a method according to one embodiment.

FIG. 3 illustrates a method according to one embodiment of the present disclosure. In block 301, an application or middleware may request access to a device. The application or middleware may be part of a virtual machine run on an instance of an O/S associated with the virtual machine. The virtual machine may be one of a plurality of virtual machines being run simultaneously on a computer system. The plurality of virtual machines may share one or more CPUs, and a hypervisor may manage access of the plurality of virtual machines to the one or more CPUs and real memory. The request to access the device may be a load operation, a store operation, or any other desired operation.

In block 302, the O/S associated with the application or middleware may generate a request to access the device. The request may be a Start Sub-Channel (SSCH) request, and may be provided from the O/S to an I/O subsystem including the hypervisor. The SSCH request will specify a sub-channel which is associated with the target device.

In block 303, the I/O subsystem will determine the device location and select the route to the specific device associated with the target sub-channel. The request will then be passed out the appropriate interface to reach the target device. This route may involve a path through switches and a network in order to reach the target device. In block 304 the device has been accessed and a connection is established to the device.

In block 305, the requested operation is performed. For example, if the requested operation is a read operation, then the I/O subsystem uses pointers and controls in the sub-channel to retrieve the target data from the target device and stores the data in host memory. If the request operation is a write operation, the I/O subsystem uses pointers and controls in the sub-channel to provide the target data from host memory to the target location of the device.

In block 306, the I/O subsystem generates an I/O interrupt upon completion of the operation to the device. The I/O interrupt may be provided to the hypervisor, for example. In one embodiment, a start time stamp is recorded in block 307 when the I/O interrupt is generated by the I/O subsystem. In another embodiment, a clock or counter may be started.

In block 308, the hypervisor manages the I/O interrupt as well as any additional I/O interrupts, commands, or instructions from the multiple instances of the O/S running on the computer system. The hypervisor may determine which O/S corresponds to the generated I/O interrupt and may determine whether to stop running another instance of the O/S to allow the I/O interrupt to be delivered, or whether to wait to deliver the I/O interrupt until the appropriate instance of the O/S is running based on a predetermined interval in which each instance of the O/S runs for a predetermined period of time.

In block 309, the hypervisor may provide the I/O interrupt to the corresponding instance of the O/S. In block 310, the instance of the O/S may generate a signal (such as Test Sub-Channel (TSCH)) to determine the state of the sub-channel and whether the device has been accessed. In embodiments of the present disclosure, an end time stamp may be recorded in block 311 at a time that the TSCH signal is received by the I/O sub-system, hypervisor, or sub-channel, and a difference between the end time and the start time may be calculated in block 312 to calculate the logical partition (LPAR) dispatch time, which may also be referred to as an interrupt delay time or hypervisor delay time. In another embodiment, a time may be stopped, and the elapsed time on the timer may provide the LPAR dispatch time.

Accordingly, a system running multiple virtual machines, each having an instance of an O/S, is able to track the time that may be added to the execution of instructions by running the virtual machines, based on a time taken by a hypervisor to manage I/O interrupts. The system and method provides real-time information regarding any delays generated by the hypervisor.

FIG. 3 provides just one example of a method according to embodiments of the present disclosure. There may be many variations to this diagram or the steps (or operations) described therein without departing from the spirit of the invention. For instance, the steps may be performed in a differing order or steps may be added, deleted or modified. All of these variations are considered a part of the claimed invention.

Figure 4:
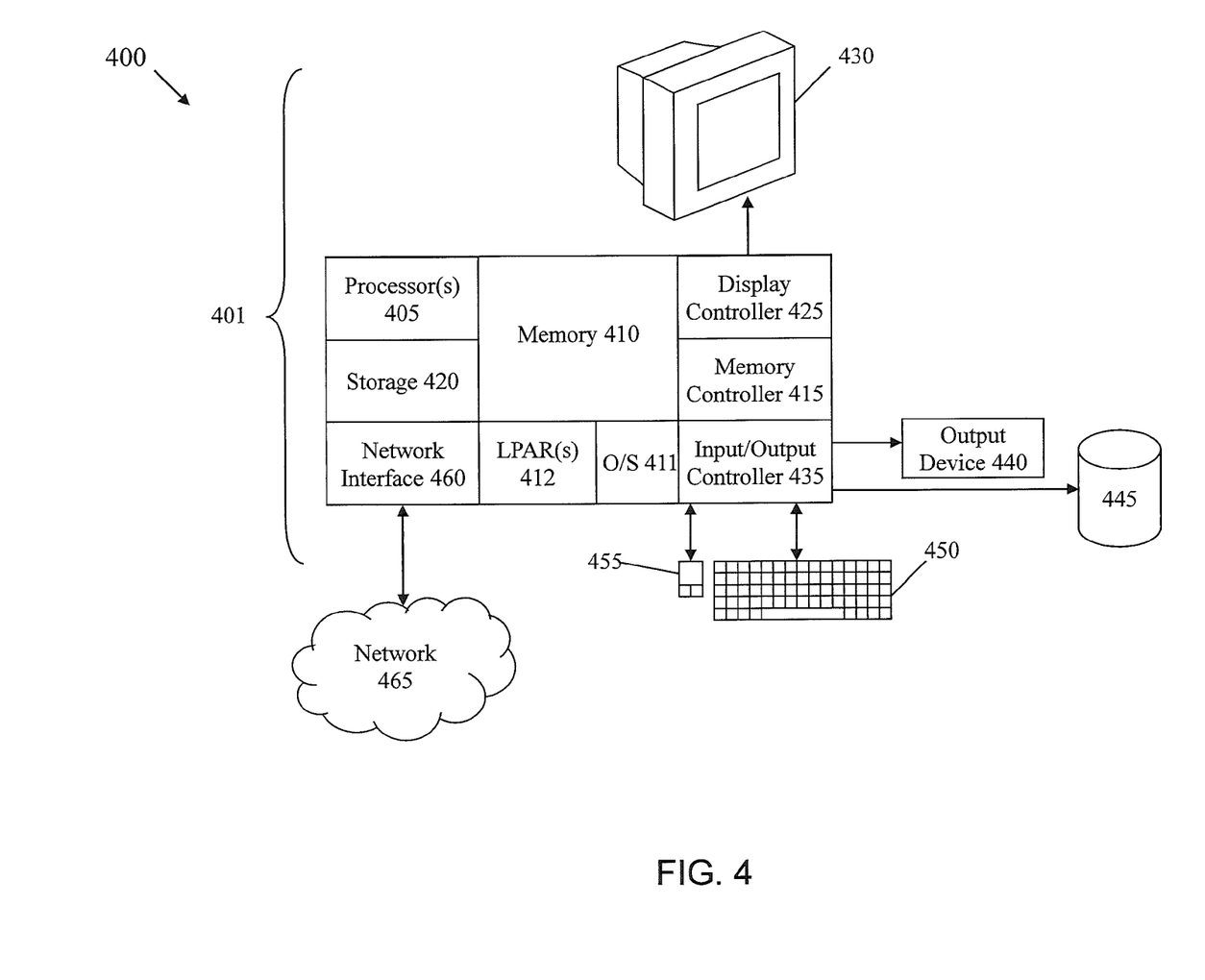
FIG. 4 illustrates a computer system according to one embodiment of the invention.

FIG. 4 illustrates a block diagram of a virtual machine system 400. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 400 therefore may include general-purpose computer or mainframe 401 capable of running multiple instances of an O/S simultaneously.

In an exemplary embodiment, in terms of hardware architecture, as shown in FIG. 4, the computer 401 includes a one or more processors 405, memory 410 coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 435 may include a plurality of sub-channels configured to access the output devices 440 and 445. The sub-channels may include fiber-optic communications ports.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 4, the instructions in the memory 410 a suitable operating system (OS) 411. The operating system 411 essentially controls the execution of other computer programs and provides scheduling, input-output control, file and data management, memory management, and communication control and related services.

The memory 410 may include multiple logical partitions (LPARs) 412, each running an instance of an operating system. The LPARs 412 may be managed by a hypervisor, which may be a program stored in memory 410 and executed by the processor 405.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute instructions stored within the memory 410, to communicate data to and from the memory 410, and to generally control operations of the computer 401 pursuant to the instructions.

In an exemplary embodiment, the real-time hypervisor delay calculation methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
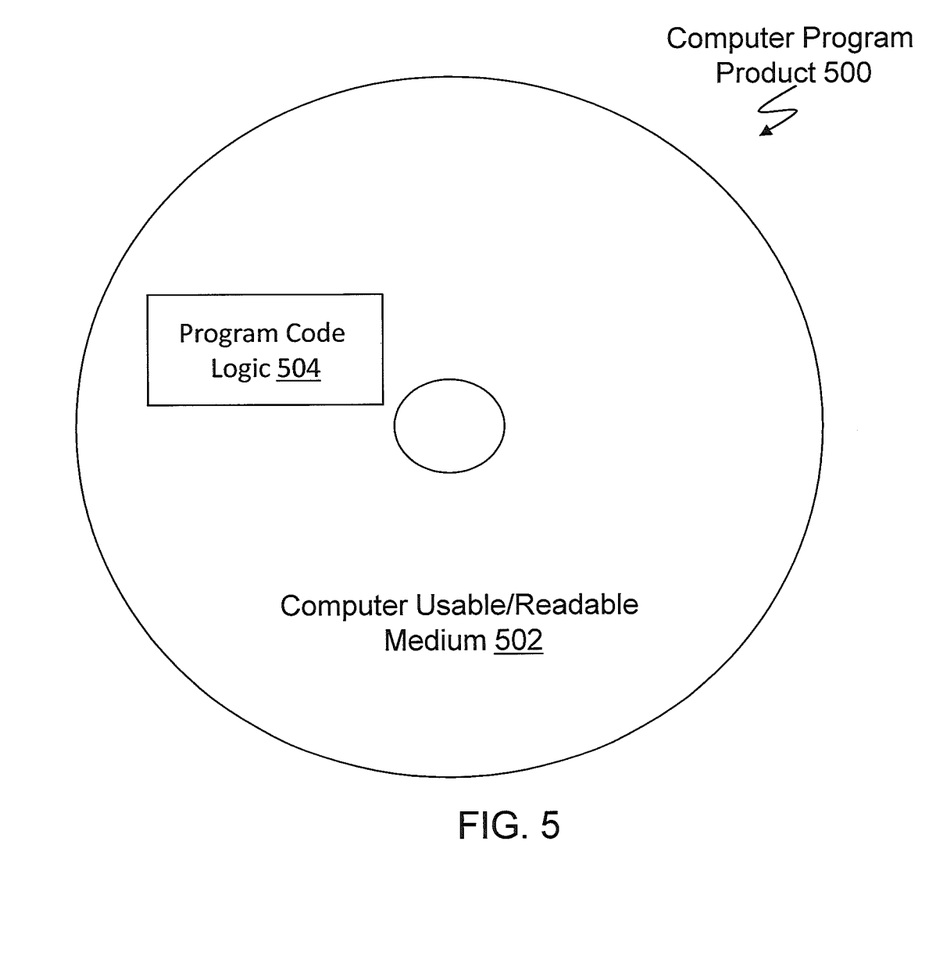
FIG. 5 illustrates a computer readable medium according to one embodiment of the invention.

As described above, embodiments can be embodied in the form of computer-implemented processes and apparatuses for practicing those processes. An embodiment may include a computer program product 500 as depicted in FIG. 5 on a computer readable/usable medium 502 with computer program code logic 504 containing instructions embodied in tangible media as an article of manufacture. Exemplary articles of manufacture for computer readable/usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits.

Embodiments of the present disclosure may be implemented by any appropriate architecture. For example, the architecture of International Business Machines (IBM) z/Architecture is utilized to implement the embodiments of the disclosure. A description for the general operations and specifications of the z/Architecture are further described in "IBM® z/Architecture Principles of Operation," Publication No. SA22-7832-08, 9th Edition, August, 2010 which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

In addition, embodiments of the present disclosure may be implemented by any appropriate system for utilizing subchannels and measuring I/O characteristics. For example, in one embodiment the measurement of I/O characteristics is accomplished according to the disclosure of application Ser. No. 10/435,906, by Scott M. Carlson et al., directed to EXTENDED INPUT/OUTPUT MEASUREMENT FACILITES, which application issued as U.S. Pat. No. 7,000,036. The disclosure of the patent application is hereby incorporated by reference in its entirety.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosed embodiments. Many modifications and variations will be apparent to those of ordinary skill in the art without departing from the scope and spirit of the invention.

While the preferred embodiment of the invention had been described, it will be understood that those skilled in the art, both now and in the future, may make various improvements and enhancements which fall within the scope of the claims which follow.

What is claimed is:

1. A computer program product comprising:
a tangible, non-transitory storage medium readable by a processing circuit of a computer and storing instructions for execution by the processing circuit for performing a method comprising:
running, by a processor of a server, a hypervisor configured to manage a plurality of logical partitions (LPARs), each LPAR running one of a plurality of instances of an operating system (O/S);
generating an input/output (I/O) interrupt by an I/O subsystem of the server, the I/O interrupt indicating that a requested I/O operation has been completed on a device;
receiving, by the hypervisor, the I/O interrupt;
determining, by the hypervisor, that a first LPAR, the first LPAR running a first instance of the O/S of the plurality of instances of the O/S, corresponds to the I/O interrupt;
providing the I/O interrupt to the first LPAR that is running the first instance of the O/S;
receiving, by the hypervisor from the first LPAR that is running the first instance of the O/S, a confirmation signal comprising a response to the I/O interrupt that indicates that the I/O interrupt has been received by the first LPAR;
determining, by the processor, an elapsed time between receiving the I/O interrupt by the hypervisor and receiving the confirmation signal by the hypervisor, the elapsed time comprising an interrupt delay time; and
performing, by the processor, at least one of capacity planning and hot spot analysis based on the determining the interrupt delay time.

2. The computer program product of claim 1, further comprising monitoring in real time interrupt delay times of operations corresponding to a plurality of I/O devices in communication with the plurality of LPARs.

3. The computer program product of claim 1, wherein the method further comprises:
managing asynchronously, by the hypervisor, a plurality of I/O interrupts corresponding to the plurality of LPARs running the plurality of instances of the O/S.

4. The computer program product of claim 1, wherein the method further comprises:
based on receiving the I/O interrupt, determining, by the hypervisor, that a second LPAR is running a second instance of the O/S on the processor when the I/O interrupt is received, and that the first LPAR is not running on the processor;
based on determining that the second LPAR is running on the processor, determining, by the hypervisor, whether to stop the second LPAR running the second instance of the O/S to provide the I/O signal to the first LPAR; and
based on determining to stop the second LPAR to provide the I/O signal to the first LPAR:
stopping the second LPAR;
resuming the first LPAR on the processor; and
providing the I/O interrupt to the first LPAR.

5. The computer program product of claim 1, wherein the method further comprises:
receiving, by the processor, a request to access the device from one of an application and a middleware running on the first instance of the O/S; and
generating, by the first instance of the O/S, a start subchannel (SSCH) signal to request connecting a subchannel of the computer to the device.

6. The computer program product of claim 5, wherein the method further comprises:
generating, by the sub-channel, control signals to start a communications pathway between the sub-channel and the device based on receiving the request to access the device.

7. The computer program product of claim 1, further comprising:
recording, by the hypervisor, a start time stamp corresponding to generation of the I/O interrupt;
recording, by the hypervisor, an end time stamp based on receiving the confirmation signal; and
determining the elapsed time based on based on the start time stamp and the end time stamp.

8. The computer program product of claim 1, further comprising:
starting, by the hypervisor, a timer based on generation of the I/O interrupt;
stopping, by the hypervisor, the timer based on receiving the confirmation signal; and
determining the elapsed time based on based on the timer.

9. A computer system comprising:
memory divided into a plurality of logical partitions (LPARs), each LPAR configured to run one of a plurality of instances of an operating system (O/S); and
a processor configured to:
run a hypervisor configured to manage the plurality of LPARs;
generate an input/output (I/O) interrupt by an I/O subsystem, the I/O interrupt indicating that a requested I/O operation has been completed on a device;
receive, by the hypervisor, the I/O interrupt;
determine, by the hypervisor, that a first LPAR, the first LPAR running a first instance of the O/S of the plurality of instances of the O/S, corresponds to the I/O interrupt;
provide the I/O interrupt to the first LPAR that is running the first instance of the O/S;
receive, by the hypervisor from the first LPAR that is running the first instance of the O/S, a confirmation signal comprising a response to the I/O interrupt that indicates that the I/O interrupt has been received by the first LPAR;
determine, by the processor, an elapsed time between receiving the I/O interrupt by the hypervisor and receiving the confirmation signal by the hypervisor, the elapsed time comprising an interrupt delay time; and
performing, by the processor, at least one of capacity planning and hot spot analysis based on the determining the interrupt delay time.

10. The computer system of claim 9, further comprising monitoring in real time interrupt delay times of operations to corresponding to a plurality of I/O devices in communication with the plurality of LPARs.

11. The computer system of claim 9, wherein the processor is configured to:
based on receiving the I/O interrupt, determine, by the hypervisor, that a second LPAR is running a second instance of the O/S on the processor when the I/O interrupt is received, and that the first LPAR is not running on the processor;
based on determining that the second LPAR is running on the processor, determine, by the hypervisor, whether to stop the second LPAR running the second instance of the O/S to provide the I/O signal to the first LPAR; and based on determining to stop the second LPAR to provide the I/O signal to the first LPAR:
   stop the second LPAR;
   resume the first LPAR on the processor; and
   provide the I/O interrupt to the first LPAR.

12. The computer system of claim 9, wherein the processor is configured to store the interrupt delay time in a segment of the memory associated with a sub-channel corresponding to the device.

13. The computer system of claim 9, the processor further configured to:
   record, by the hypervisor, a start time stamp corresponding to generation of the I/O interrupt;
   record, by the hypervisor, an end time stamp based on receiving the confirmation signal; and
   determine the elapsed time based on based on the start time stamp and the end time stamp.

14. The computer system of claim 9, the processor further configured to:
   start, by the hypervisor, a timer based on generation of the I/O interrupt;
   stop, by the hypervisor, the timer based on receiving the confirmation signal; and
   determine the elapsed time based on based on the timer.

15. A computer program product comprising:
   a tangible, non-transitory storage medium readable by a processing circuit of a computer and storing instructions for execution by the processing circuit for performing a method comprising:
   running, by a processor of a server, a hypervisor configured to manage a plurality of logical partitions (LPARs), each LPAR running one of a plurality of instances of an operating system (O/S);
   generating an input/output (I/O) interrupt by an I/O subsystem of the server, the I/O interrupt indicating that a requested I/O operation has been completed on a device;
   receiving, by the hypervisor, the I/O interrupt;
   determining, by the hypervisor, that a first LPAR, the first LPAR running a first instance of the O/S of the plurality of instances of the O/S, corresponds to the I/O interrupt;
   providing the I/O interrupt to the first LPAR that is running the first instance of the O/S;
   receiving, by the hypervisor from the first LPAR that is running the first instance of the O/S, a confirmation signal comprising a response to the I/O interrupt that indicates that the I/O interrupt has been received by the first LPAR;
   determining, by the processor, an elapsed time between receiving the I/O interrupt by the hypervisor and receiving the confirmation signal by the hypervisor, the elapsed time comprising an interrupt delay time;
   based on receiving the I/O interrupt, determining, by the hypervisor, that a second LPAR is running a second instance of the O/S on the processor when the I/O interrupt is received, and that the first LPAR is not running on the processor;
   based on determining that the second LPAR is running on the processor, determining, by the hypervisor, whether to stop the second LPAR running the second instance of the O/S to provide the I/O signal to the first LPAR; and
   based on determining to stop the second LPAR to provide the I/O signal to the first LPAR:
     stopping the second LPAR;
     resuming the first LPAR on the processor; and
     providing the I/O interrupt to the first LPAR.

16. The computer program product of claim 15, further comprising, based on determining not to stop the second LPAR:
   permitting the second LPAR to run the second instance of the O/S on the processor for a predetermined interval;
   based on elapsing of the predetermined interval, stopping the second LPAR;
   resuming the first LPAR on the processor; and
   providing the I/O interrupt to the first LPAR after resuming the first LPAR.

17. A computer system comprising:
   memory divided into a plurality of logical partitions (LPARs), each LPAR configured to run one of a plurality of instances of an operating system (O/S); and
   a processor configured to:
   run a hypervisor configured to manage the plurality of LPARs;
   generate an input/output (I/O) interrupt by an I/O subsystem, the I/O interrupt indicating that a requested I/O operation has been completed on a device;
   receive, by the hypervisor, the I/O interrupt;
   determine, by the hypervisor, that a first LPAR, the first LPAR running a first instance of the O/S of the plurality of instances of the O/S, corresponds to the I/O interrupt;
   provide the I/O interrupt to the first LPAR that is running the first instance of the O/S;
   receive, by the hypervisor from the first LPAR that is running the first instance of the O/S, a confirmation signal comprising a response to the I/O interrupt that indicates that the I/O interrupt has been received by the first LPAR;
   determine, by the processor, an elapsed time between receiving the I/O interrupt by the hypervisor and receiving the confirmation signal by the hypervisor, the elapsed time comprising an interrupt delay time;
   based on receiving the I/O interrupt, determine, by the hypervisor, that a second LPAR is running a second instance of the O/S on the processor when the I/O interrupt is received, and that the first LPAR is not running on the processor;
   based on determining that the second LPAR is running on the processor, determine, by the hypervisor, whether to stop the second LPAR running the second instance of the O/S to provide the I/O signal to the first LPAR; and
   based on determining to stop the second LPAR to provide the I/O signal to the first LPAR:
     stop the second LPAR;
     resume the first LPAR on the processor; and
     provide the I/O interrupt to the first LPAR.

18. The computer system of claim 17, further comprising, based on determining not to stop the second LPAR:
   permitting the second LPAR to run the second instance of the O/S on the processor for a predetermined interval;
   based on elapsing of the predetermined interval, stopping the second LPAR;
   resuming the first LPAR on the processor; and
   providing the I/O interrupt to the first LPAR after resuming the first LPAR.

* * * * *